United States Patent [19]
Barnett et al.

[11] Patent Number: 5,664,093
[45] Date of Patent: Sep. 2, 1997

[54] SYSTEM AND METHOD FOR MANAGING FAULTS IN A DISTRIBUTED SYSTEM

[75] Inventors: Bruce Gordon Barnett, Troy; John Joseph Bloomer, Schenectady; Hsuan Chang, Clifton Park; Andrew Walter Crapo, Scotia; Michael James Hartman, Clifton Park; Barbara Jean Vivier, Niskayuna, all of N.Y.

[73] Assignee: General Electric Company, Schenectady, N.Y.

[21] Appl. No.: 686,443

[22] Filed: Jul. 25, 1996

Related U.S. Application Data

[63] Continuation of Ser. No. 364,567, Dec. 27, 1994, abandoned.

[51] Int. Cl.$^6$ ............................................. G06F 11/34
[52] U.S. Cl. ................................... 395/183.07; 395/50
[58] Field of Search ..................... 395/50, 54, 183.01, 395/183.02, 183.07; 364/274, 274.3, 274.5

[56] References Cited

U.S. PATENT DOCUMENTS

| | | | |
|---|---|---|---|
| 4,888,771 | 12/1989 | Benignos et al. | 395/183.02 |
| 5,159,685 | 10/1992 | Kung | 395/183.02 |
| 5,247,664 | 9/1993 | Thompson et al. | 395/600 |
| 5,263,157 | 11/1993 | Janis | 395/600 |
| 5,297,262 | 3/1994 | Cox et al. | 395/275 |
| 5,361,347 | 11/1994 | Glider et al. | 371/29.1 |
| 5,402,431 | 3/1995 | Saadeh et al. | 364/200 |
| 5,428,619 | 6/1995 | Schwartz et al. | 371/20.1 |
| 5,448,722 | 9/1995 | Lynne et al. | 395/183.12 |
| 5,452,433 | 9/1995 | Nihart et al. | 395/500 |
| 5,539,877 | 7/1996 | Winokur et al. | 395/183.02 |

OTHER PUBLICATIONS

"Management Moving Toward A Unified View", Distributed Networking, 8 pages.
University of Michigan, Future Computing Environment Monitoring, Team Final Report, Jul. 28, 1994., 25 pages.

*Primary Examiner*—Robert W. Beausoliel, Jr.
*Assistant Examiner*—Albert Decady
*Attorney, Agent, or Firm*—David C. Goldman; Marvin Snyder

[57] ABSTRACT

A system and method for managing faults in a distributed system. The fault management system includes a configuration manager that maintains configuration information of components used in the distributed system. A plurality of measurement agents obtain performance information from the components in the distributed system. A diagnostic system has a plurality of rules written according to the configuration information stored therein. The diagnostic system is coupled to the configuration manager and each of the plurality of measurement agents and identifies faults occurring in the distributed system and provides solutions for correcting the faults The diagnostic system receives the configuration information from the configuration manager and the performance information from the plurality of measurement agents and uses the configuration and performance information with the plurality of rules to identify faults and provide solutions for the faults.

6 Claims, 4 Drawing Sheets

SYSTEM AND METHOD FOR MANAGING FAULTS IN A DISTRIBUTED SYSTEM

This application is a Continuation of application Ser. No. 08/364,567 filed Dec. 27, 1994, now abandoned.

BACKGROUND OF THE INVENTION

The present invention relates generally to system management, and more particularly to a system for managing faults in a distributed system.

A distributed system is difficult to manage due to complicated and dynamic component interdependencies. Managers are used in a distributed system and are responsible for obtaining information about the activities and current state of components within the system, making decisions according to an overall management policy, and performing control actions to change the behavior of the components. Generally, managers perform five functions within a distributed system, namely configuration, performance, accounting, security, and fault management.

None of these five functions are particularly suitable for diagnosing faults occurring in complex distributed systems. Diagnosing faults using manual management is time consuming and requires intimate knowledge of the distributed system. In other management techniques such as SNMP, the diagnosis of faults is difficult to obtain because relationships between components within the distributed system are not easily ascertained. Since relationships are hard to ascertain, it is difficult to determine causes and effects, and thus diagnose faults. Other approaches that have been used to diagnose faults are with conventional expert systems. However, conventional expert systems are too fragile since their rules are inapplicable for changes occurring in the configuration of the distributed system. In addition, the conventional expert system is too general to enable autonomous control. For example, when an expert system attempts to analyze a distributed application, the expert system is aggravated because the distributed system is dynamic. Every time a process starts up, it has a unique identification number that changes with each execution. Therefore, the rules in the expert system will no longer apply. Also, it is difficult to isolate faults in a distributed environment because a resource limitation on one system may cause a performance degradation in another system, which is not apparent unless one is very familiar with the architecture of the distributed application and how the components work together.

SUMMARY OF THE INVENTION

Therefore, it is a primary objective of the present invention to provide a management system that understands abstract relationships between components (i.e., processes, hosts, controllers, disks, connections) and has rules that are written according to the abstract relationships.

A second object of the present invention is to provide a management system that uses an diagnostic system that understands the meta-model and model of the distributed system and has rules based on the meta-model relationship.

Thus, in accordance with the present invention, there is provided a fault management system for use in a distributed system. The fault management system comprises a configuration manager that maintains configuration information of components used in the distributed system. A plurality of measurement agents obtain performance information from the components in the distributed system. A diagnostic system has a plurality of rules written according to the configuration information stored therein. The diagnostic system is coupled to the configuration manager and each of the plurality of measurement agents and identifies faults occurring in the distributed system and provides solutions for correcting the faults. The diagnostic system receives the configuration information from the configuration manager and the performance information from the plurality of measurement agents and uses the configuration and performance information with the plurality of rules to identify faults and provide solutions for the faults.

While the present invention will hereinafter be described in connection with a preferred embodiment and a system and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
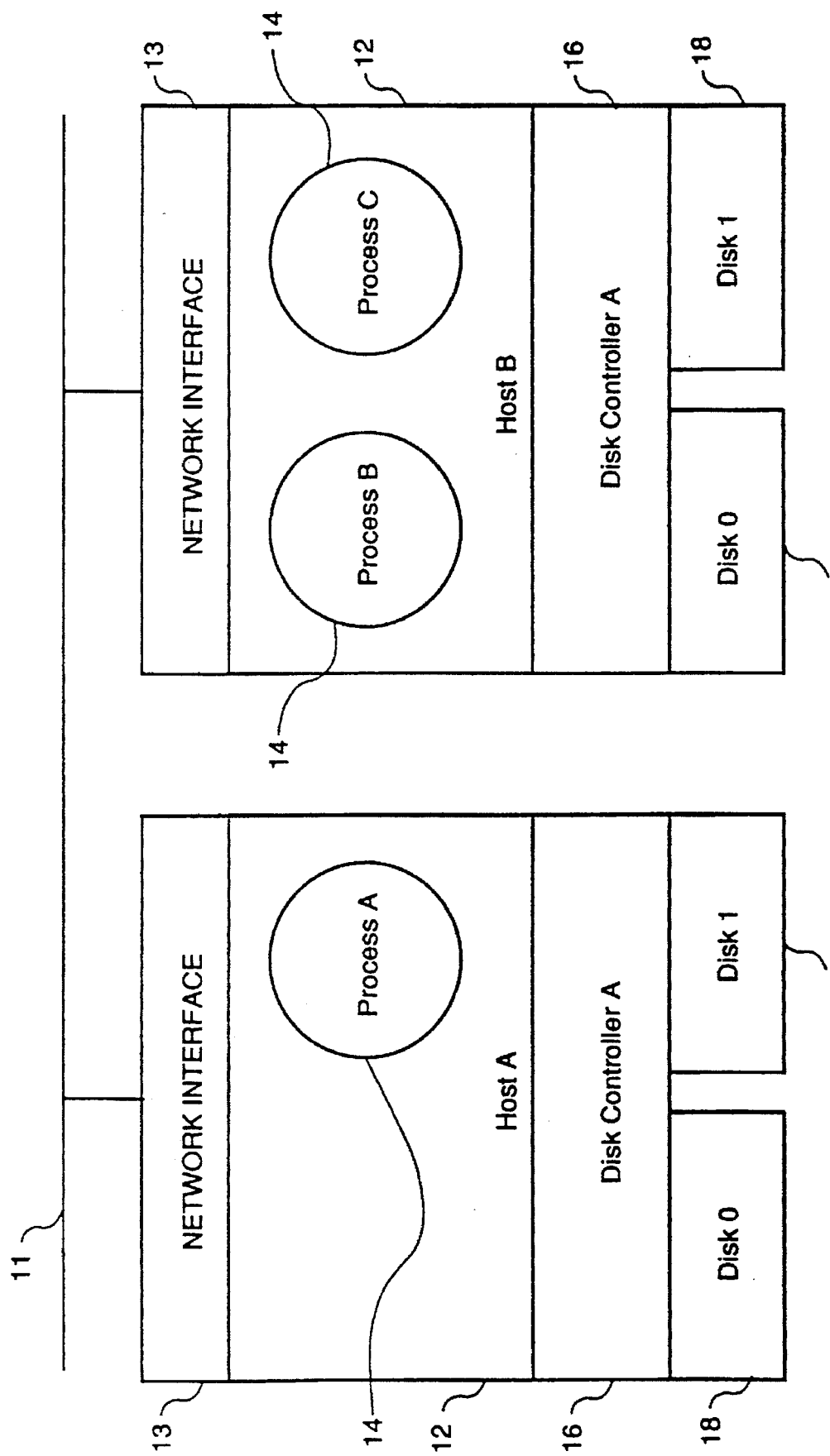
FIG. 1 is a schematic of a conventional distributed system.

FIG. 1 is a schematic of a distributed system 10. The distributed system includes a plurality of host computers 12. In FIG. 1, there are shown two host computers A and B, but there may be more host computers. These computers are preferably workstations or personal computers connected together by a network 11 and a network interface 13. Each of the host computers, A and B, each run several application processes 14. In particular, host computer A runs process A and host computer B runs processes B and C. In this example, process A uses the services of process B on host computer B. In addition, each host computer includes a disk controller 16 and two disks (i.e., 0 and 1) 18. If process A on host A is reporting a performance problem, it is very hard for a conventional management system to isolate the cause of the fault and provide a solution. For example, if the problem occurring at process A is being caused by a problem at host C, then it will be very difficult for the management system to identify the fault because there is no apparent relationship between processes A and C.

Figure 2:
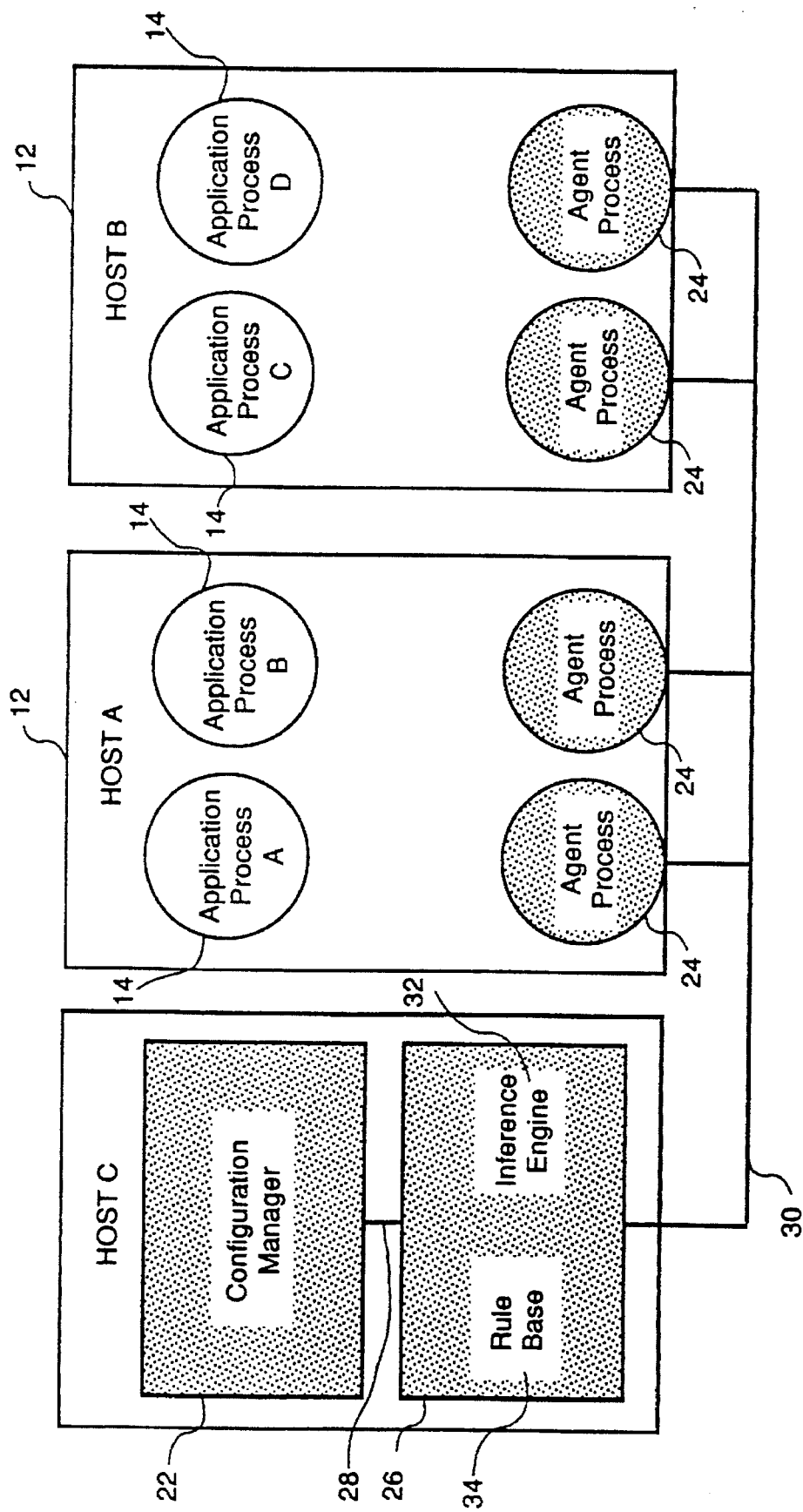
FIG. 2 schematic of the fault management system used in the present invention.

The present invention has recognized the problems associated with the distributed system and has overcome these problems with a fault management system which is shaded in the schematic of FIG. 2. The fault diagnosis system includes a configuration manager 22 that maintains configuration information of components in hosts A and B. Host computers A and B each run several application processes A and B and C and D, respectively. A plurality of measurement agents 24 obtain performance information from the components and the processes in the hosts A and B. A diagnostic system 26 having a plurality of rules written according to the configuration information is coupled to the configuration manager and each of the plurality of measurement agents through lines 28 and 30, respectively. The diagnostic system receives the configuration information from the configuration manager and the performance information from the plurality of measurement agents and uses the configuration and performance information with the plurality of rules to identify faults and provide solutions for any faults. There are several mechanisms which permit the diagnostic system to ask the configuration manager and the measurement agents for information. For example, there may be a coordinator which the diagnostic system uses to communicate with the configuration manager and the agents. The agents may in turn talk to other agents if they need to abstract and encapsulate information to the diagnostic system.

Figure 3:
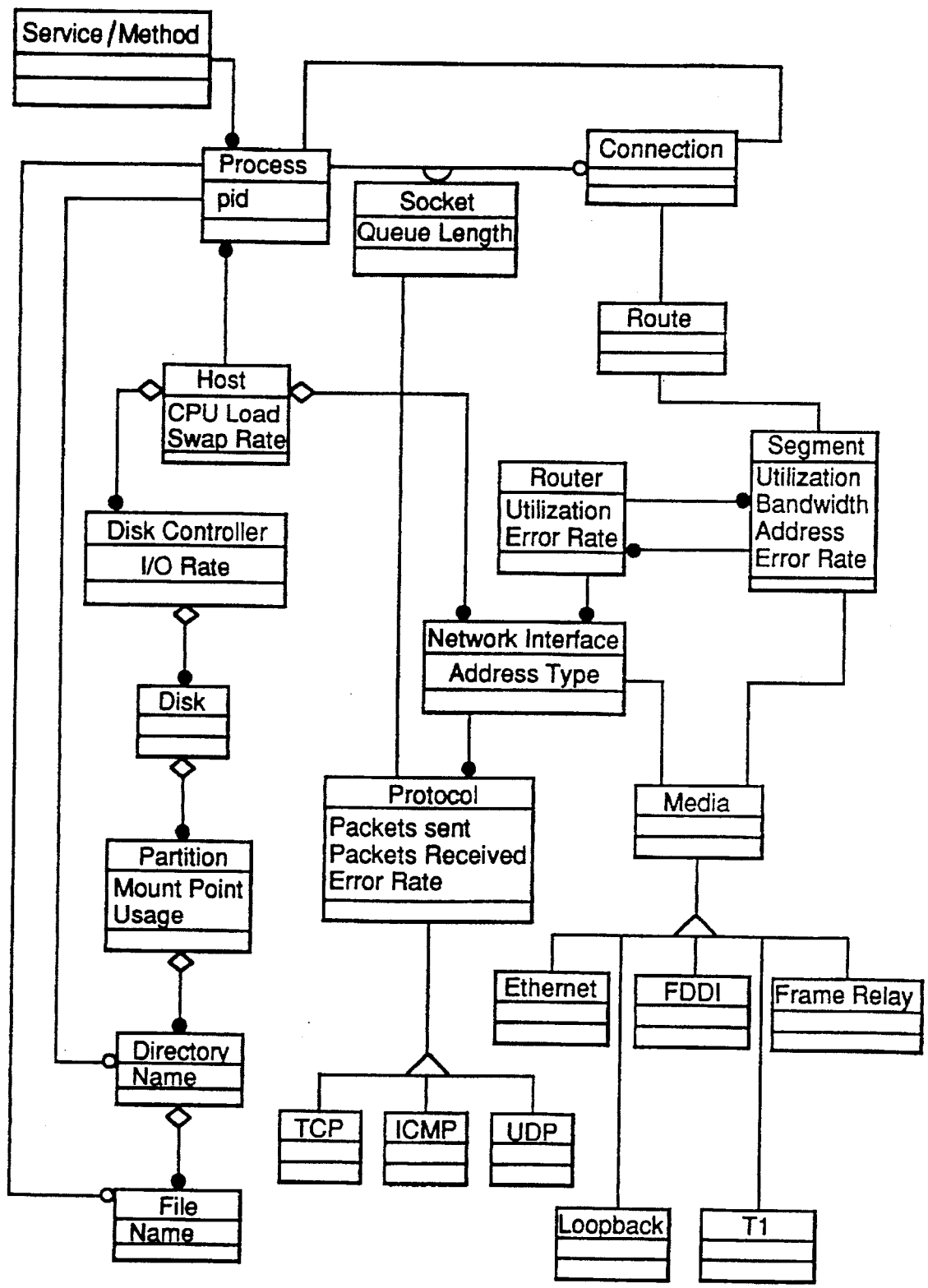
FIG. 3 is an example of object model used by the fault management system.

The configuration manager 22 contains configuration information which specifies the model of the distributed application. In particular, the configuration information specifies what classes of components are required, the instances needed, the interconnection or binding of interfaces and the allocation of software to hardware. An example of an object model illustrating configuration information that could be stored within the configuration manager is shown FIG. 3. The object model was created by using OMTool™, a graphical tool sold by Martin Marietta, but can be generated by any graphical software that is capable of producing object-oriented diagrams such as Paradigm Plus™ and Software-Through-Picture's IDE™. The baste object-oriented diagram element is an object class, which provides a description of a set of objects having a common structure and behavior. In FIG. 3, the object class is drawn as a box with two sections. The top section contains the name of the object class. The bottom section contains a list of attributes which are data values for the object class. In FIG. 3, some of the object classes are process, host, disk, network interface, media, segment. The object classes are related in many different forms by relationships which are portrayed in the object diagram with lines between the object boxes. Symbols at one or both extremities of a relationship line reflect how many objects of one object class are associated with each object of another class. A line ending with a solid circle means many (i.e. zero or more); a line ending without a symbol means exactly one; and a line ending in a circle means zero or one. There are four types of relationships, generalization, aggregation, association, and qualified association. Generalization segregates an object class into subclasses and is designated by using a triangle symbol. An aggregation is an assembly-component or a part of relationship and is designated by a diamond symbol. An association is a relationship of two or more independent objects and is designated by a line. A qualified association uses a qualifier as an attribute and is represented by a box.

In the object meta model of FIG. 3, each of the processes within the distributed system may connect to zero or more other processes. Also, each process uses one host, which may have one or more disk controllers or network interfaces. The disk controllers may have one or more disks, which may have one or more partitions, which may have one or more directories, which may have one or more files. The network interface has one or more protocols which have subclasses of TCP, ICMP, and UDP, which are standard protocols. Also, the network interface has one media which could be chosen from the subclasses of Ethernet, Loopback, FDDI, T1, and Frame Relay. The media has exactly one segment which has one or more routers and exactly one route, which has one connection.

The diagnostic system 26 has the capability to understand how components in object diagrams are related, but does not know the individual instances or meta model of a particular distributed system. For example, the diagnostic system knows that the hosts have disk controllers and disk controllers have disks attached to them, processes require machines to run on, and that some programs require other programs to be running. This information on the meta-model can either be stored in a rule base or learned by using a meta meta model to query the configuration manager 22. Since the diagnostic system knows what objects in the distributed system are related, it can query the configuration manager so that the meta model can be constructed dynamically. The querying operation is performed by an inference engine 32. The diagnostic system also includes a rule base 34 comprising a plurality of rules for the various objects within the distributed application. By using the abstract relationships learned from the configuration manager and the rules from the rule base, the diagnostic system is able to monitor performance and diagnose several types of failures that are reported from any of the plurality of measurement agents. For example, if a service cannot be performed, then the diagnostic system will find any malfunctioning component. If a service has poor performance, then the rules will explain how the various components affect the overall performance. By examining the individual components, the diagnostic system will use its rules to suggest improvements that will increase performance. The solutions may include system parameter tuning, application modifications, configuration changes, load balancing, and suggestions of possible hardware upgrades if needed.

As with the meta model, the diagnostic system 26 does not have information about the static or dynamic model, but can obtain all of the information from the configuration manager 22 and the measurement agents 24. The static model includes the different hardware components that are important to the diagnostic system. The static model also specifies the relationships between applications such as a program (i.e., Client A) that requires another program (i.e., Server B). These relationships remain the same for a set of specific applications. A different set of applications would have a different static model. On the other hand, the dynamic model understands the relationship between the static model and the dynamic nature of applications running on a computer. For example, every time an application runs on a computer, it has different characteristics (i.e., process ID and machine ID). The configuration manager understands how the static and dynamic models are related. For example, the configuration manager will know that the program Client A is running on a machine B with process ID#314. It will also know that program Server B is running on a machine C with process ID#2310. Information on the static and dynamic model can either be stored in a rule base or learned by querying the configuration manager. Therefore, the fault management system can be used to diagnose faults that occur on either the hardware or applications.

In addition to obtaining information regarding abstract relationships, the diagnostic system can query the measurement agents 24 about individual objects. The agents use data encapsulation to provide information related to any objects that the diagnostic system is interested in. More specifically, information that is actually derived from several other sources may be combined and presented to the fault diagnosis system as belonging to an object that the diagnostic system is interested in. By using abstractions and encapsulation, it is possible for several different implementations to obtain the same information. This also allows redundant methods so that the information can be retrieved by more than one mechanism, which can be useful when diagnosing a malfunctioning system. Upon receiving status information from the measurement agents, the diagnostic system then can query the configuration manager about any component and its relationship with other components. In turn, the configuration manager will specify one or more related components in response to the query. The diagnostic system then can apply rules from its rule base and derive a proper control action to be taken. One rule, for example, might state that if the error rate of a network interface is greater than 0.025%, then there is a hardware problem associated with a network interface, or that the network may be undergoing changes (i.e., cables being plugged and unplugged).

The above procedure enables the diagnostic system to determine causes and effects of a particular fault by eliminating other possible causes that are not applicable. Also, this procedure can detect objects that may be a possible cause for a fault, even if the object was not detected. In addition, this procedure can be used in a "what-if" scenario to diagnose faults. In particular, if an object fails, the diagnostic system can determine what will break. Also, the diagnostic system could be used to determine what fault will cause a particular object to break. Another feature of the present invention is that a probability analysis can be used to determine a likely cause of a fault. By using a probability analysis, the time necessary to diagnose a problem will be reduced as will the number of measurements taken by the agents.

The fault management system works as following for a fault being reported from a particular application. Initially, the fault is reported through the configuration manager 22 or from a measurement agent 24. The components that may be faulty are treated as objects. The diagnostic system 26 then asks the configuration manager what classes of objects depend from the application (i.e., process "X" connects to process "Y"). Using its abstract model, the configuration manager then reports that the application has certain processes associated with it and that the processes may have a certain type of connection. In addition, the configuration manager finds any other applications or services being used. The diagnostic system then asks for the explicit relationships about the given fault. More specifically, the diagnostic system queries about what process does this particular application use; does it have any connections; which other applications are there; and does it have to be functioning. The configuration manager then returns the individual objects that exist, if any. Also, the configuration manager may state that it does not know how to obtain the desired information. The fact that there is a relationship, but the configuration manager does not know how to get this relationship, is itself useful information to the diagnostic system. Once a list of objects that are associated with the fault are received, the diagnostic system can now query the measurement agents 24 about the status of each instance of an object. In addition, the diagnostic system can ask about other objects that are required by the list of objects require. This allows the diagnostic system to learn the relationships between all components necessary for a functional system, as well as the status of each component. Using the rules in the rule base, the diagnostic system can identify performance problems and provide solutions for overcoming faults and sluggish performance of an application. The diagnostic system enables faults to be determined reactively (i.e., after a failure has occurred) or proactively (i.e., determine problems before they occur).

Figure 4:
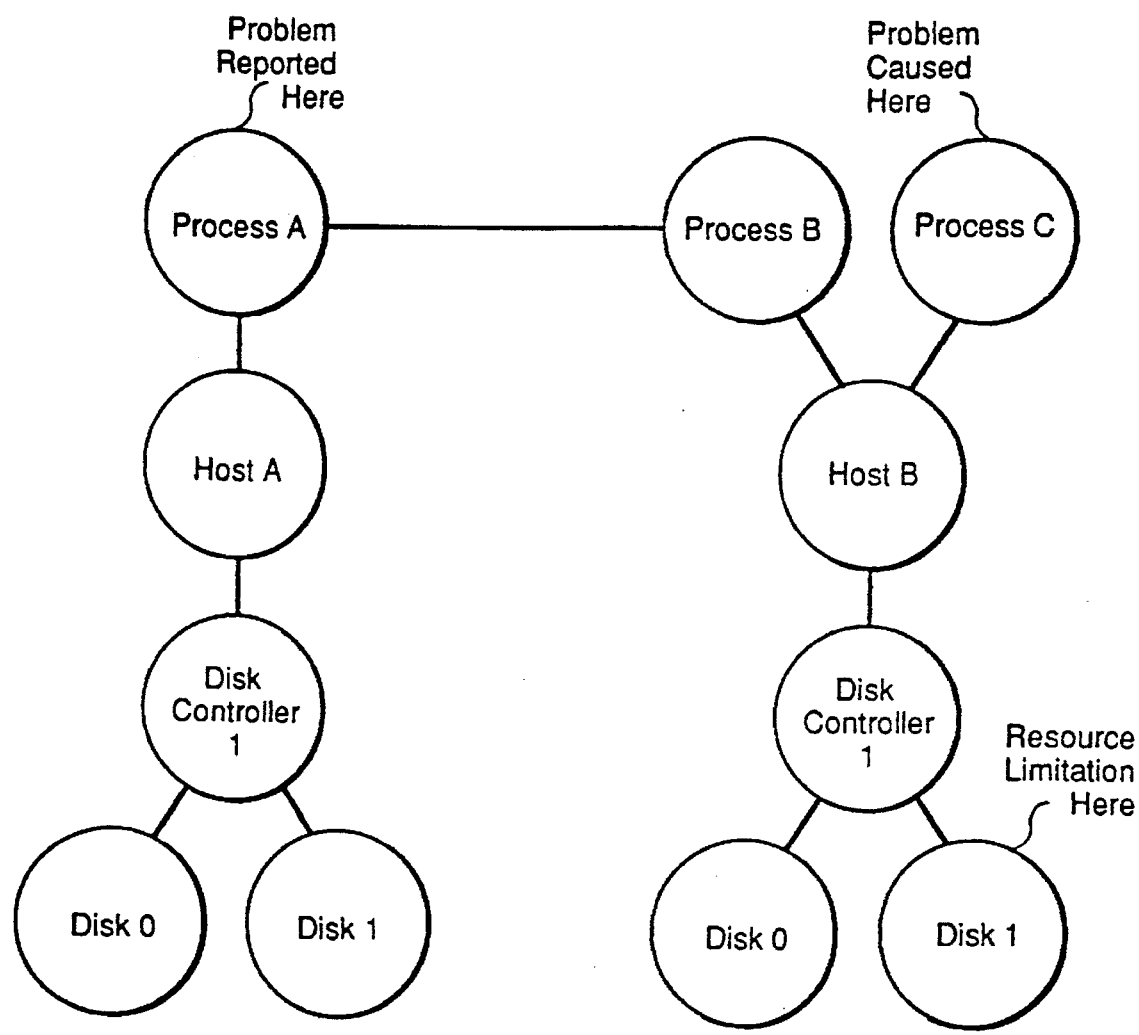
FIG. 4 is an object diagram of the distributed system shown in FIG. 2.

An example of the fault management system is illustrated in FIG. 4, which shows an object diagram of the distributed system in FIG. 2. This object diagram is simplified to illustrate one problem that may occur and be solved by the present invention. It does not show other objects such as network interfaces, partitions, segments, media, etc. that may cause faults. In this object model, process A is being run on host A, which has a disk controller with two disks. Processes B and C are being run on host B which also has a disk controller with two disks. Also, process A is using the services of process B on host B. In this example, a problem is being reported at process A, but the problem is being caused by process C on host B. There is no apparent relationship between processes A and C.

In order to isolate the problem, the diagnostic system 26 queries the configuration manager 22 to learn the relationship of the distributed system. Once the relationship is known, it is possible to find out if process C is affecting the performance of process A. Since the diagnostic system will first learn of the problems of process A from a failure report, it can investigate the resources on Host A. The diagnostic system will learn that there is nothing out of limits on this machine. Thus, the diagnostic system will conclude that an external process is causing the performance problem. By learning of the relationship between process A and B, the diagnostic system can investigate Host B. In particular, it might then learn that disk 1 on host B is over-utilized, and that process B uses that disk. Then the diagnostic system can ask the configuration manager what other processes are using disk 1. It can then learn that process C also uses the same disk as process B, and therefore the resource conflict of process B and C are causing a performance degradation on Process A. In addition, the diagnostic system can eliminate faults related to non-essential resources. For instance, disk 0 might also be over-utilized, but this is not important unless the diagnostic system was trying to find an alternate disk for process C for purpose of load balancing.

Since the model of the distributed system is maintained by the configuration manager, and because the rules in the diagnostic system apply to classes of components, it is possible to introduce new component types, which require new models and meta-models. This includes new computer architectures (e.g. multiprocessor systems) as well as new software architectures. Applications may contain services, functions, and perform actions. These functions or actions may depend on other functions or actions. If the actions correspond to individual steps required in building a system, then the diagnostic system can report why a step cannot be performed, or why the performance may be unsatisfactory. In this manner, rules can be developed that can solve problems relating to workflow, etc.

Since the rules apply to generic classes of objects, the fault management system can analyze the performance of any system that has the same abstract model or classes. A model can be constructed that describes a generic computer system. Rules can be constructed that analyze the performance of a generic computer system. The configuration of any computer can be learned because the information is known to the computer. Therefore, this fault management system can be used to analyze the performance of any computer system, and make recommendations on ways to improve the performance of the system, without requiring any modifications of the rules.

It is therefore apparent that there has been provided in accordance with the present invention, a system and method for managing faults in a distributed system that fully satisfy the aims, advantages and objectives hereinbefore set forth. The invention has been described with reference to several embodiments; however, it will be appreciated that variations and modifications can be effected by, a person of ordinary skill in the art without departing from the scope of the invention.

For example, the fault and performance analysis can be customized to particular applications and provide precise isolation of the faulty component by adding additional relationships in the abstract, or meta-model, and by adding additional rules related to these new classes of components. Therefore, this invention can identify performance problems to a coarse level with little effort, and to a fine level with additional customization.

In addition, the fault and performance analysis of the present invention can be used for any system composed of hardware and software components, and even abstract components like actions, tasks, and deliverables. It can be integrated into network management applications and capacity planning tools. It can do load balancing and predictive fault analysis. In general it can be applied to any distributed application on a computer network that needs to react to changes in a dynamic or static environment.

The fault management system can also determine what higher level components will be affected by out-of-specification system components. In particular, if a particular disk must be replaced, then the fault management system will determine what applications will be affected. If a system has high performance disks and low performance disks, then the fault management system will determine what is the optimum configuration. Also, the fault management system can determine whether the network needs to be reconfigured and if so, how. This information can be used to make time critical decisions and intelligent guesses. Each component may have a value that indicates the probability of failure. Even if the diagnostic system cannot find out precisely which component is being used, as long as it knows the component reporting the problem requires another component, and other component used are working properly, it can estimate the probability that any particular component can cause the problem. Also, if the system knows that a component is used during action A, but not during action B, then if action B fails, that component is not the cause of the problem.

We claim:

1. A fault management system for use in a distributed system, comprising:

a configuration manager maintaining configuration information of components used in the distributed system, the configuration information comprising an object-oriented model describing relationships between the components, wherein the object-oriented model maintains a list of the components as objects and an understanding of how the objects are related;

a plurality of measurement agents obtaining performance information from the components in the distributed system; and a diagnostic system coupled to the configuration manager and each of the plurality of measurement agents for identifying faults occurring in the distributed system and providing solutions for correcting the faults, the diagnostic system comprising a knowledge base having a plurality of rules for the components and an inference engine for applying the rules to the performance information, the diagnostic system receiving the configuration information from the configuration manager and the performance information from the plurality of measurement agents and using the configuration and performance information to identify faults and provide solutions for the faults, the diagnostic system identifying faults by querying the configuration manager for the object-oriented model of the components and using the model along with the plurality of rules in the knowledge base to identify the causes responsible for the fault and to provide a solutions for correcting the faults, the diagnostic system initiating the identification of faults at any location in the object-oriented model.

2. The fault management system according to claim 1, wherein, the object-oriented model comprises a static model and a dynamic model.

3. The fault management system according to claim 1, wherein the components comprise hardware components, software components, actions, tasks, and operation results.

4. A method for managing faults occurring in a distributed system with a fault management system comprising a configuration manager maintaining configuration information of components used in the distributed system, a plurality of measurement agents obtaining performance information from the components in the distributed system, and an diagnostic system coupled to the configuration manager and each of the plurality of measurement agents for identifying faults occurring in the distributed system and providing solutions for correcting the faults, the method comprising the steps of:

developing an object-oriented model describing relationships between the components, wherein the object-oriented model includes a list of the components as objects and an understanding of how the objects are related;

identifying the component where a fault is being reported;

querying the configuration manager to obtain the object-oriented model describing the relationship of the reported faulty component with other components in the distributed system;

determining from the object-oriented model which components may be responsible for the reported fault, the determination of faults being initiated at any location in the object-oriented model;

examining the components and applying rules within the diagnostic system to the relationship described in the object-oriented model to identify causes responsible for the fault; and providing solutions for correcting the faults.

5. The method according to claim 4, wherein, the object-oriented model comprises a static model and a dynamic model.

6. The method according to claim 4, wherein the components comprise hardware components, software components, actions, tasks, and operation results.

* * * * *